Dec. 11, 1934.　　　　C. N. BARTON　　　　1,983,892
EGG GRADING AND PACKING APPARATUS
Filed Oct. 23, 1933　　　4 Sheets-Sheet 4
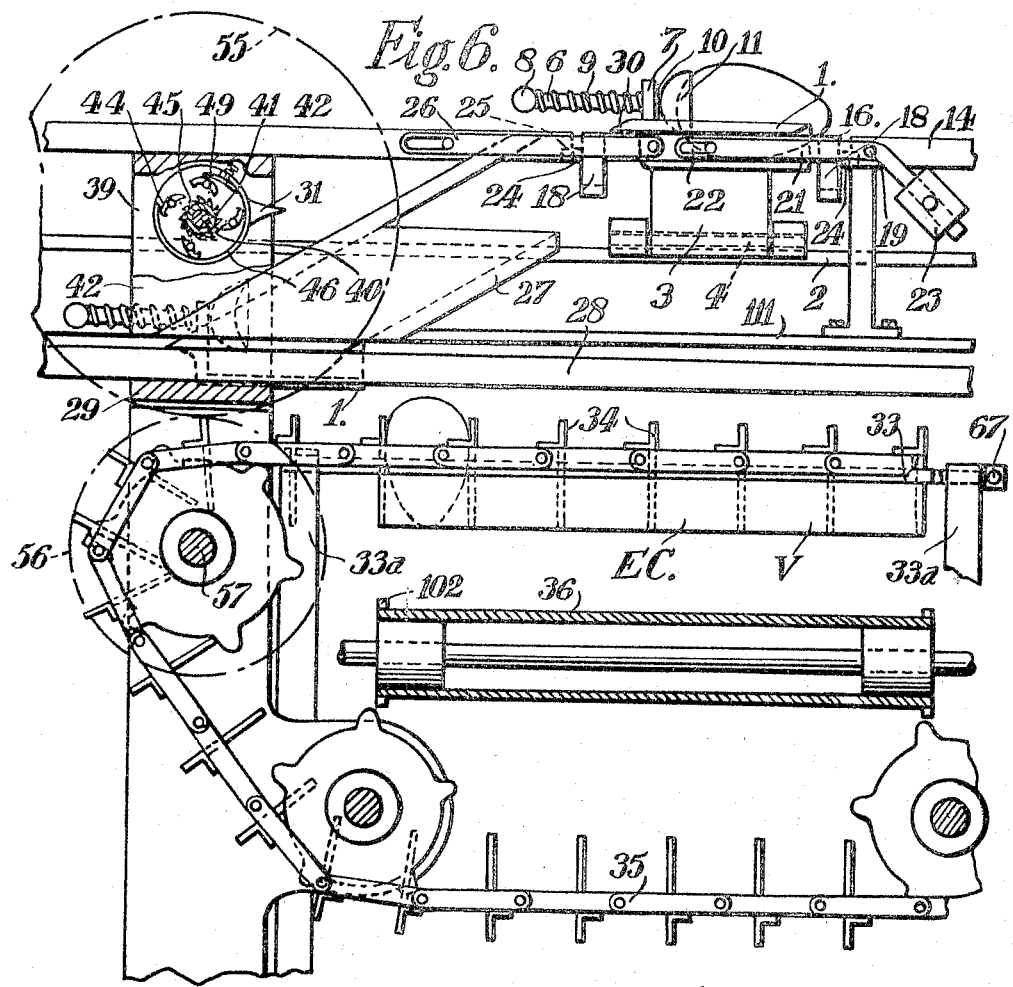
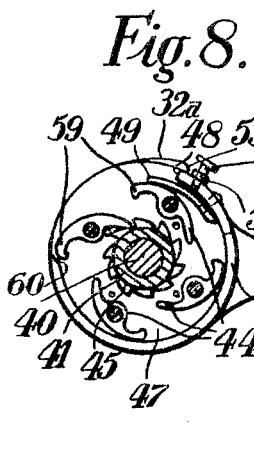
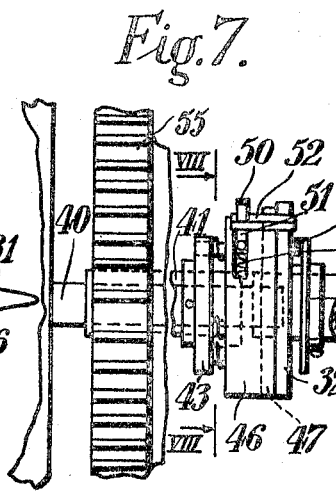
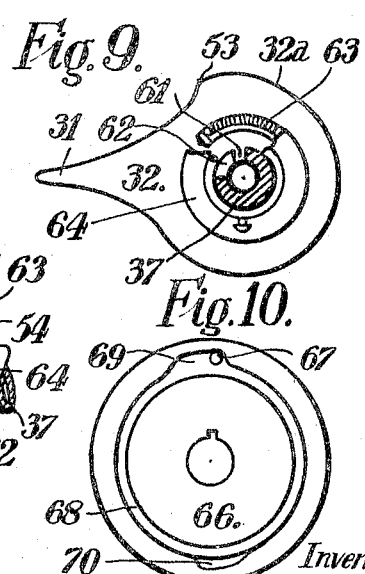

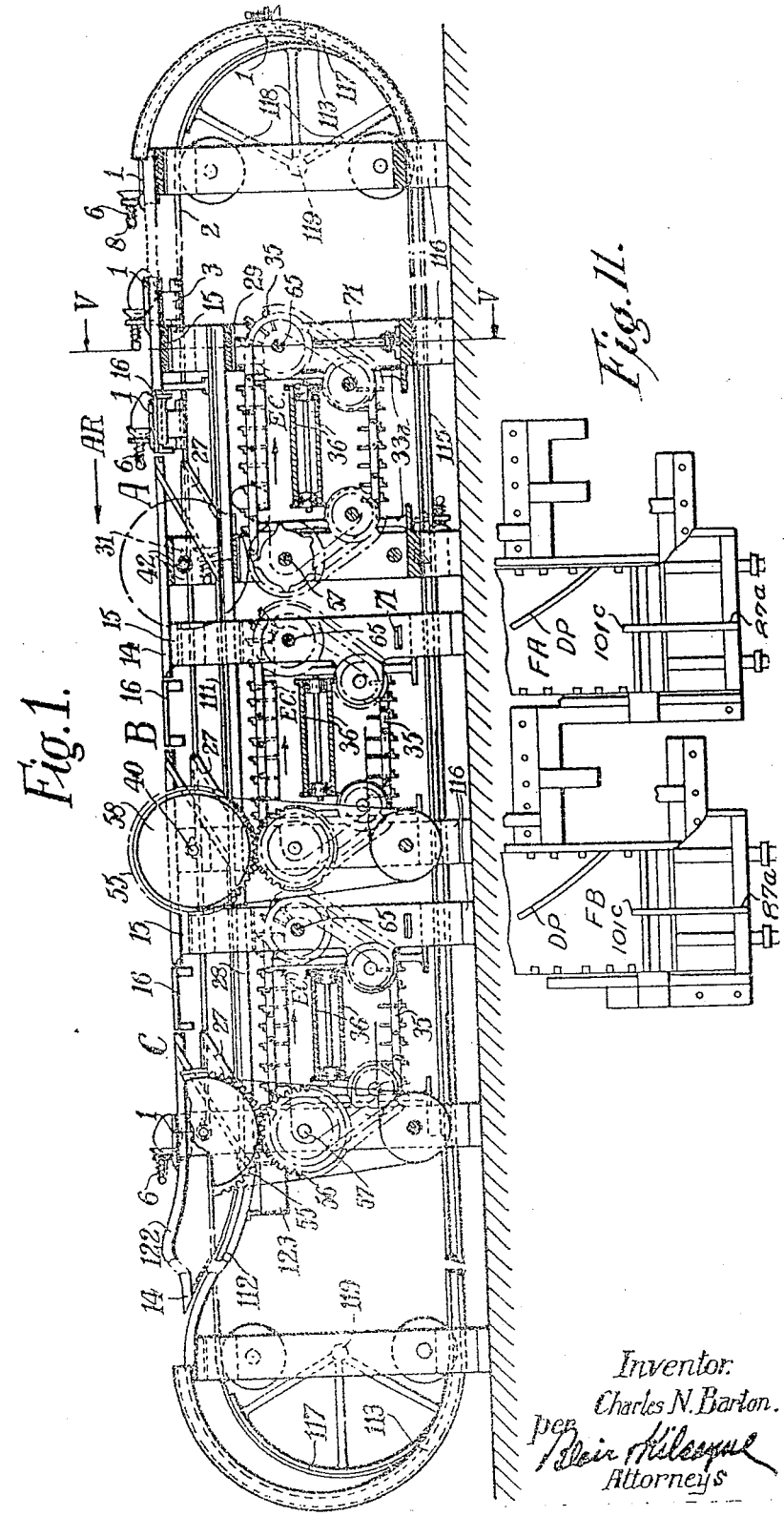

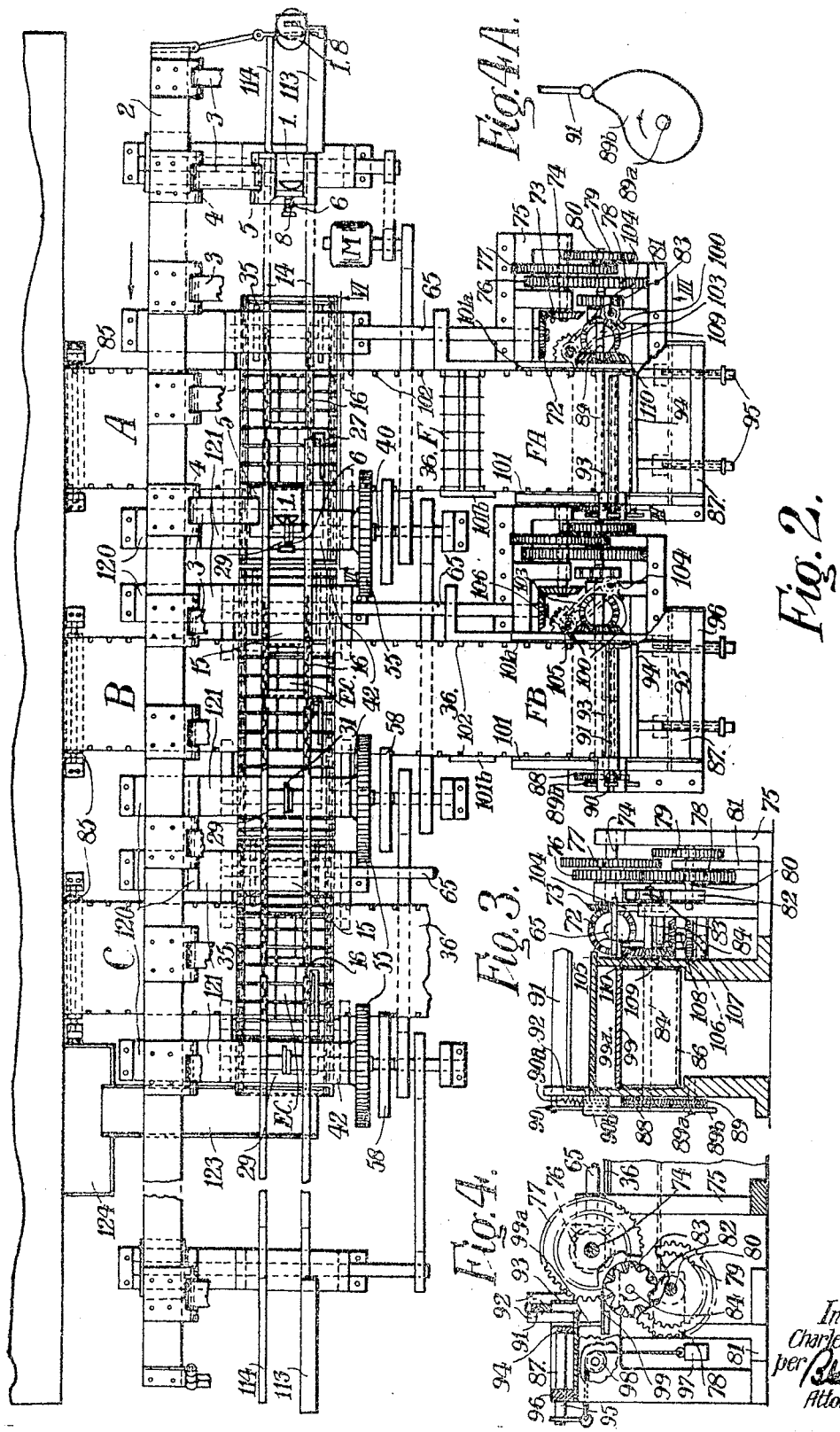

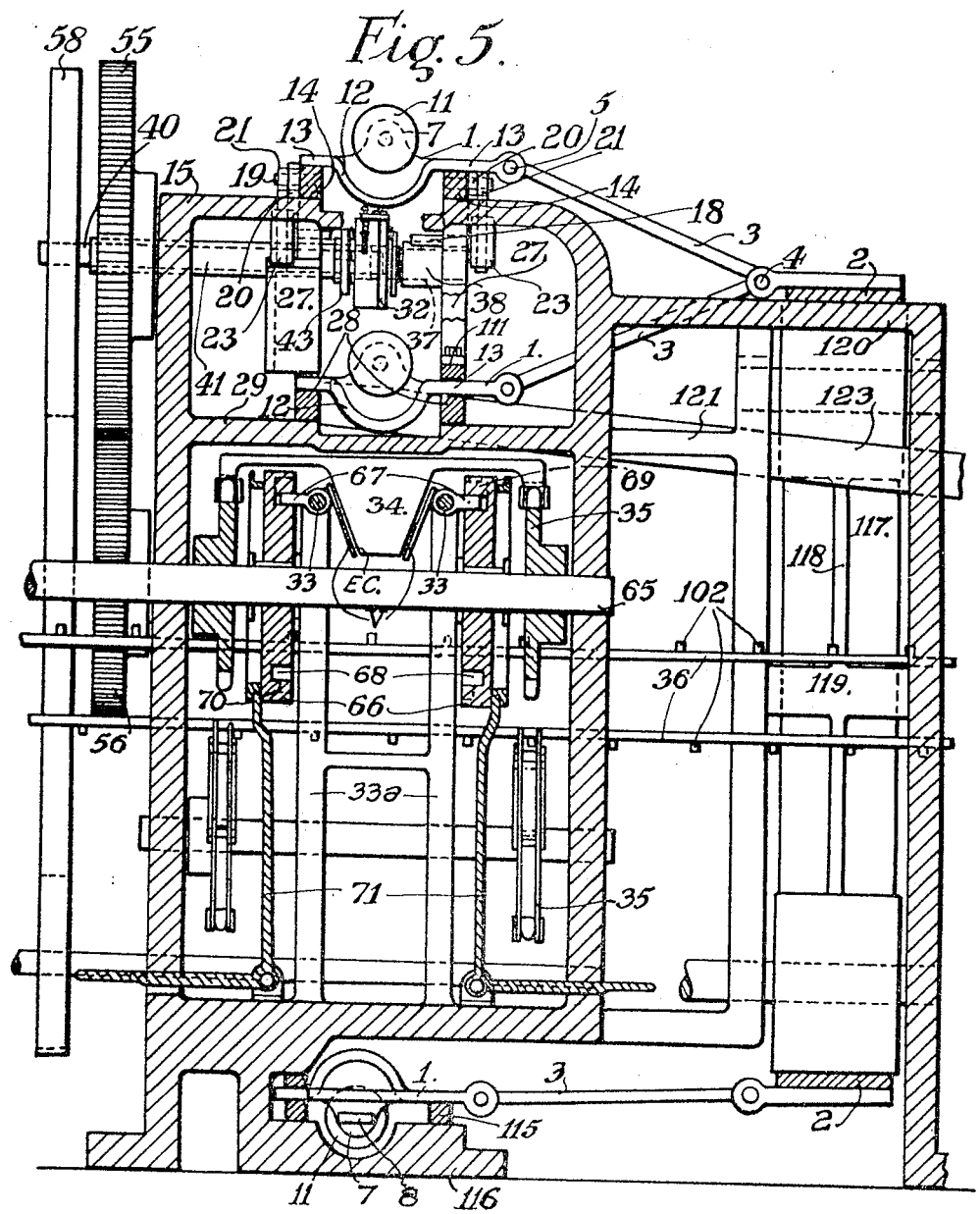

Patented Dec. 11, 1934

1,983,892

UNITED STATES PATENT OFFICE 1,983,892

EGG GRADING AND PACKING APPARATUS

Charles Nathaniel Barton, Wimbledon, London, England

Application October 23, 1933, Serial No. 694,848
In Great Britain October 3, 1932

14 Claims. (Cl. 226—14)

This invention relates to improvements in or connected with apparatus for grading and packing eggs.

It is well known that eggs in addition to being candled in order to obtain an indication of their freshness are frequently graded according to their weight and machines have hitherto been proposed for automatically sorting eggs into their several grades. These machines however have merely sorted the eggs and they have had to be handled separately during any subsequent packing operation. One of the objects of the present invention is to provide apparatus which not only grades the eggs but also packs said graded eggs in a condition ready for insertion for instance into the fillers of the cartons or boxes usually employed for transporting eggs.

A further object of the present invention is to provide an egg grading and packing machine in which eggs to be graded are fed along a track and means located in said track are actuated by eggs of selected weights in such a way as to divert or discharge such eggs and deposit them in a container appropriate to the grade concerned.

Another object of the present invention is to provide egg grading and packing mechanism in which a plurality of egg supporting cradles are caused to travel along a track by means of a conveyor and to encounter along said track a plurality of traps operable by predetermined weights for diverting cradles carrying eggs of the appropriate weight for causing actuation of the trap concerned.

Yet another object of the present invention is to provide an egg grading and packing machine in which the graded eggs are fed into containers each one of which includes a separate cell for each egg, said containers either forming part of the machine or being separate therefrom.

A further object is to provide an egg grading and packing machine in which the graded eggs are fed into containers appropriate to each grade and means are provided whereby the graded eggs may be released from said container as soon as a desired number has been collected, said released eggs being received in a filler or the like into which the eggs are finally to be stored.

With the above and other objects in view the present invention resides in the combination of parts hereinafter described and claimed in the appended claims.

In carrying out the present invention the eggs may be fed along a horizontal track including a plurality of balanced traps each one being loaded so that it will only be actuated by an egg-carrier bearing an egg of appropriate weight, the actuation of a trap may then cause a diversion in the path of the egg-carrier so that the egg is caused to move from its carrier and be deposited in a container. The aforesaid traps would of course be so arranged that the egg carriers first encountered that one which is actuated by the maximum load and thereafter encountered the ones actuated by smaller weights and the number of such traps would of course correspond with the desired number of grades.

A separate egg container is preferably associated with each discharge point from the grading mechanism and each such container includes a separate compartment for each egg, one being preferably located for the reception of an egg automatically by operation of the grading mechanism.

The aforesaid containers may be adapted to receive any desired number of eggs and preferably only serve as temporary containers the eggs being subsequently released and allowed to enter any desired filler or the like. In such cases the eggs in the temporary containers are released at intervals, which are preferably so chosen that at each discharge one complete line of compartments in a filler is loaded. The fillers in such cases are preferably automatically fed to the grading apparatus in a manner hereinafter referred to and forming the subject of my copending application of even date and entitled "Improvements in egg-packing apparatus."

The means for supporting the eggs to be graded preferably comprise a plurality of dishes or cradles adapted to be caused to traverse along a track by means of pivoted link or like connections with a conveyor which may conveniently be in the form of an endless band. The traps provided in the said track may then cause these dishes or cradles to move down one of a series of inclined paths when the weight of the egg just overcomes the loading on the appropriate trap and in moving down said inclined path part of the cradle or dish concerned may strike against a member adapted to operate the means feeding the container under said egg-supporting dish and a spring loaded member mounted on said dish may be caused to move and thus urge the egg from the dish into the cell of the container. It is to be observed that in this way an empty cell of a container will be located in proper position with respect to the appropriate trap for receiving an egg automatically as an egg carrier moves along the relevant path for discharging an egg into that container. Said containers for the eggs are preferably either carried by or parts thereof are interconnected to form an endless band and they may for instance include two side members or plates inclined towards each other so as normally to support an egg but permitting such egg to be easily released when desired by turning said inclined sides. The release of said eggs from the container is preferably effected automatically as soon as the desired number of eggs has been collected. Thus for instance if the eggs have to be transferred to a filler having six cells in a row then as soon as five compartments in the container are filled said sides are preferably opened so as to deposit the eggs into the filler and the sixth egg may then be permitted to drop into the sixth compartment. Since the appropriate one of the aforesaid egg containers is advanced by one compartment automatically each time an egg is diverted towards the container it is apparent that the releasing means for instance may be operated directly by a cam driven by the compartment feeding mechanism and such cam mechanism if desired may be adjustable so that eggs are released from the container after any required number has been collected.

The above mentioned egg-supporting cradles and the co-operating traps are preferably so formed that it is ensured that an egg will be diverted to the appropriate container even though its weight is only sufficient to move the trap very slightly. Thus for instance each cradle may have a sharp inclined leading edge and the edges of the frames of the traps may also be chamfered so that very slight downward movement of the trap will initiate the discharge action.

A grading machine according to the present invention may be operated by any suitable motor or in any other desired manner and the several operations are preferably effected by means of a single driving unit. The feeding of the eggs preferably takes place continuously and the intermittent operations such as the discharge of the eggs, the feeding of the containers and the filler feeding mechanism may be effected through the medium of any suitable clutch mechanism or pawl and ratchet or Geneva stop mechanism.

In carrying out the present invention the compartments for receiving graded eggs are preferably caused to travel in a direction opposite to that in which the ungraded eggs are conveyed and the filler feeding mechanism is preferably arranged to feed the fillers across said direction of travel although these relative directions may be varied to suit any particular purposes.

I preferably provide means for discharging any very light eggs which may pass all of the traps and such discharge may for example be effected by causing the cradles to tilt after passing the final trap or a positive stop may be provided for causing ejection of eggs from such trap. Those cradles which drop through the traps may of course be caused to return to the track in any suitable way such for example as by means of inclined guides or the like.

In order that my invention may be well understood I will now describe by way of example one embodiment thereof in association with means for feeding fillers or the like to the grading apparatus in such a way that the graded eggs may be packed into said fillers and will make reference to the accompanying drawings in which:—

Figure 1 is an elevation, partly in section of the egg grading apparatus,

Figure 2 is a plan of Fig. 1 including a preferred form of apparatus for feeding fillers to the grading apparatus, Figure 3 is a section on the line III—III of Fig. 2, Figure 4 is a part sectional elevation of the filler feeding apparatus taken from the right of Fig. 2, and shows more particularly the Geneva stop mechanism by which an intermittent movement is imparted to the conveyor carrying the fillers to the grading apparatus, Figure 4A is a detail of the cam controlling the plunger of the magazine, Figure 5 is an enlarged section on the line V—V of Fig. 1, Figure 6 is an enlarged section on the line VI—VI of Fig. 2 with the right-hand portion removed, Figure 7 is an enlarged detail view of the clutch mechanism associated with one grading section of the machine, for connecting the partition conveyor of that section to the power drive each time an egg is graded, Figure 8 is a section on the line VIII—VIII of Fig. 7, Figure 9 is an enlarged detail view of the cam controlling the clutch of the mechanism shown in Fig. 7, Figure 10 is an enlarged detail view of a dumping cam, two of which are associated with each partition conveyor to control the discharge of eggs therefrom into a waiting filler, Figure 11 is a diagrammatic plan view of a modification of the form of apparatus shown in Figure 2 for feeding fillers to the grading apparatus.

Referring to the figures, the machine comprises a number of egg grading sections A, B, C, each of which is associated with apparatus such as FA or FB for feeding fillers to the section so as to receive the graded eggs. For convenience only, three sections are shown, although it will be understood that any number of sections may be incorporated in the machine according to requirements, standard grading usually demanding four grades of eggs ranging from 2½ ozs. and over down to 1¾ ozs. in steps of ¼ oz. It will be noted that the first section A will grade eggs of the heaviest weight and that the following sections B and C will grade eggs of progressively decreasing weights.

The eggs to be graded, after being candled, are passed through the machine by means of an endless series of cradles 1 and a main driving conveyor 2 to which the cradles are secured by links 3 hinged at 4 to the conveyor belt and at 5 to the cradle, the conveyor 2 being driven continuously in the direction of the arrow AR in Fig. 2 from a motor M through suitable belt and pulley mechanism as shown or through any suitable gearing and the eggs are preferably placed on the cradles with their blunt ends in the direction of travel.

Each cradle 1 is provided at its front end with a plunger 6 supported by an upstanding flange 7 between which and the nose 8 of the plunger is carried a spring 9 which holds the plunger in a retracted position with a stop 10 thereon abutting against the flange 7 so that an egg can be placed on the cradle with its blunt end engaging in a cap 11 fixed to the inner end of the plunger 6, and during grading can be discharged from the cradle by causing the plunger to move across the cradle as will be hereinafter described.

The cradle 1 is conveniently curved at 12 to ensure that an egg is held securely as it passes through the machine.

At each side of the cradles 1 are provided runners 13 which slide on rails 14 carried on supports 15 constituting part of the main frame of the machine, the rails being interrupted at each section to receive a weighing platform or trap 16 which is maintained level with the rails 14 and is set according to the grading weight of its particular section.

In the particular embodiment shown, the trap 16 comprises two sides 17 connected by U-shaped struts 18 to form a skeleton frame which will not impede progress of the cradles 1. Pivoted at 19 to the rails 14 and spaced therefrom by washers 20 is a pair of levers 21 the forward ends of which have elongated slots 22 by which they are pivotally connected to the sides 17 of the trap so that the latter can sink down vertically below the rails 14. The rear ends of the levers 21 beyond the pivot 19 carry adjustable weights 23 which tend normally to hold the sides 17 of the trap level with the rails 14 with stops 24 engaging recesses 25 in the rails. Instead of the recesses, the stops could be extended to engage the inclined guideway referred to below. The weights 23 are so adjusted that upon a cradle 1 carrying an egg corresponding in weight to the minimum grading weight of the particular section or to any weight up to the maximum weight of the said section, the trap sinks vertically downwards and is guided in its movement by pivoted links 26 secured to the rails 14. Obviously forms of trap other than that shown may be employed, for example, spring loaded traps could be used.

Under each trap 16 is located an inclined guideway 27 leading to a second pair of rails 28 carried on transverse members 29 of the main frame, the forward edge 30 of each cradle 1 having a corresponding inclination to the guideway 27 so that a slight depression of the trap 16 will ensure that the relevant cradle will be diverted towards the second track constituted by the rails 28.

Upon a cradle 1 being diverted, it will be caused to move down the inclined guideway 27 by the movement of the conveyor 2, and during its passage the nose 8 will engage a projecting arm 31 on a cam 32 thereby first rotating the cam 32 to a limit position so as to operate clutch mechanism as hereafter described, and when the said limit position is reached, being itself depressed against the action of the spring 9 so that the plunger 6 moves across the cradle 1 and discharges the egg into a compartment of a container EC. This container consists of two plates V pivotally mounted on rods 33 carried in supports 33a, the two plates being balanced to take up a V-formation as will be seen from Fig. 5, and thus form a trough for the eggs. Associated with the plates V is a plurality of compartment forming partitions 34 carried on an endless chain conveyor 35—hereinafter termed the partition conveyor—so as to traverse along the trough, the partitions 34 being spaced to form in conjunction with the plates V a series of compartments each of which will contain an egg.

The partition conveyor 35 is moved intermittently step by step as each cradle is diverted to and moves down the inclined guideway 27 to operate the aforesaid clutch mechanism and after a predetermined number of eggs have been discharged into the container EC the plates V are opened to permit the eggs to drop into the cells of a filler F which is fed automatically by a filler conveyor 36 moving transversely with respect to the partition conveyor 35.

Before proceeding to describe the means whereby the plates V are opened and the filler conveyor is moved, the operation of the aforesaid clutch mechanism controlling the movement of the partition conveyor will now be described with particular reference to Figs. 7-9.

The cam 32 is loosely mounted on a fixed hollow shaft 37 carried in a support 38 secured to a distancing support 39 between the upper and lower right-hand rails as viewed from Fig. 5, the end of a drive shaft 40 being rotatably supported in the hollow shaft 37. The drive shaft 40 rotates within a second hollow shaft 41 which is rotatably carried in bearings in supports 42 constituting part of the main frame. Fixed to the second hollow shaft 41 is a plate 43 on which is pivotally mounted a plurality of pawls 44 spring pressed to engage in the teeth of a ratchet 45 fixed to the drive shaft 40. The pawls 44 are carried within a cylinder 46 projecting from a plate 47 fixed to the first hollow shaft 37, and are normally prevented from engaging the teeth of the ratchet 45 by abutting against the wall of the cylinder 46.

A part of the wall of the cylinder 46 is cut away at 48 and one of the pawls 44 normally abuts against a sliding plate 49 having a stem 50 which projects through a slot 51 in the wall and on which is slidably mounted a transverse finger 52 located in the path of a hump 53 on the cam 32. The sliding plate 49 is urged forwardly by a spring 54 housed in the slot 51.

Fixed on the outer end of the shaft 41 is a toothed wheel 55 which gears with a toothed wheel 56 carried on the sprocket shaft 57 of the partition conveyor 35, while the drive shaft 40 is driven continuously by means of the pulley wheel 58 which is rotated through auxiliary belts and pulley wheels by the motor M. Obviously, instead of this belt drive any suitable chain or gear drive could be employed.

When the nose 8 of the plunger 6 of an egg carrying cradle 1 pushes on the arm 31 of the cam 32 the latter is rotated clockwise, whereupon its hump 53 by engaging the finger 52 withdraws the plate 49 so that the pawl 44 abutting against it, is permitted to rotate and engage with the teeth of the ratchet 45; thus the gear wheel 55 is connected to the drive shaft 40—which is rotating anti-clockwise—and imparts a rotary movement to the gear wheel 56 to cause the partition conveyor to move in a direction opposite to that of the main drive conveyor 2 for the cradles.

After a movement sufficient to bring an empty compartment of the container EC into a position to receive the egg from the cradle which is descending the guideway 27, the engaging pawl is withdrawn from the teeth of the ratchet 45 by its tail 59 engaging the cam surface 60 of the wall of the cylinder 46, Fig. 8 showing a pawl just about to be withdrawn. Thus the movement of the partition conveyor is stopped. At the same time another pawl 44 comes into abutment with the plate 49—which has previously been restored by the the action of its spring 54 as the finger 52 came on to the falling-away part 32a of the cam 32—ready to be released by the next descending cradle.

Subsequent to the stopping of the partition conveyor the cam 32 reaches its limit position as determined by a key 61 abutting against the end of a keyway 62 in the fixed hollow shaft 37 and the plunger 6 is then moved across the descending cradle so as to discharge the egg with its pointed end downwards into the waiting empty compartment.

As the descending cradle reaches the lower rails 28 the arm 31 of the cam 32 slips past the nose 8 and the cam is then restored to its initial position by a spring 63 which is connected at one end to the cam and at the other end to a plate 64 fixed to the hollow shaft 37.

Figure 6 shows the position of the parts after the cam has been restored, the following cradle just being weighed, and if the egg it carries is of the proper weight for that section the cradle will move down the guideway 27 to repeat the sequence of operations just described.

Referring now to the operation of the mechanism after a predetermined number of eggs has been deposited into the compartments of the container EC, one pair of the main sprocket wheels of the partition conveyor is carried on the shaft 57 and the other pair is carried on a shaft 65 (see particularly Fig. 5) on which is also mounted a pair of dumping cams 66 co-operating with projecting arms 67 fixed to the rods 33 carrying the plates V of the container EC.

In the present embodiment the dumping cams 66 are arranged to release the plates V for opening when six or three eggs are in the container, the machine as shown being especially adapted either for fillers having six cells in a row or for fillers having only three cells in a row, although fillers of other capacities than these could be provided for, for example, fillers having five cells in a row. Moreover, the timing of the dumping cams 66 is such that the plates V are opened just as the partition conveyor stops at the end of the sixth or third step, before the container EC receives the sixth or the third egg as the case may be, thus the five or two eggs already in the container are deposited in the row of cells of the filler underneath the container, and the sixth or third egg will be discharged direct to the filler.

The construction of the dumping cams 66 will be seen in Figs. 5 and 10, each cam consisting of a disc slidably mounted on the shaft 65 and provided with a circular recess 68 in which the arm 67 rides as the cam rotates so that the plates V are prevented from opening when the eggs are discharged thereinto.

In Fig. 5 the dumping cams are in a position for releasing the plates V when six eggs have been deposited. To this end after the sixth step of the partition conveyor the arms 67 are positioned in enlargements 69 of the recesses 68 (see Fig. 10) the depths of which enlargements are the same as those of the recesses 68 and the surfaces of which are cammed to permit the plates V to open just as the sixth step is completed and to be closed during the seventh step. The construction as shown assumes that the dumping cam makes one complete revolution for six steps of the partition conveyor so that only one enlargement 69 is necessary in each cam.

So that the timing may be changed to open the plates V when three eggs have been deposited, each of the dumping cams 66 is provided with a second enlargement 70 which is only half the depth of the recess 68 and therefore does not affect the arm 67 when the cam is in the position of Fig. 5, but upon the shift levers 71 being depressed the dumping cams are moved outwardly to bring the enlargements 70 into operative position. Thus both enlargements 69 and 70 will be operative to open the plates V at each third step of the partition conveyor.

A particular advantage of the dumping cams above described consists in that merely by altering the position and contour of the enlargements 69 and 70 the timing of the opening of the plates V can be changed.

It will be noted that when the plates V have opened to let the five or two eggs already held in the container EC to be dropped out, they will balance to the inclined position so that the sixth egg will first engage the plates V which will then open to let it pass through to the waiting filler, such an arrangement breaking the fall of the egg and eliminating any possibility of damage.

After one row of cells in the filler F has been filled it is necessary to move the filler conveyor 36 one step so as to bring the next row of cells underneath the container EC.

The preferred mechanism for effecting this operation forms part of the subject of co-pending application of even date and entitled "Improvements in egg-packing apparatus", but as it forms a component of the complete egg grading and packing machine and essentially works in synchronism with the egg grading apparatus, the filler feed mechanism will now be described.

Each of the shafts 65 carrying the dumping cams 66, is extended and carries at its extremity a bevel 72, Fig. 2, which gears with a second bevel 73 mounted on a shaft 74 rotatably mounted in supports 75. On the shaft 74 is slidably mounted a pair of change speed wheels 76 and 77 adapted to be engaged with a corresponding pair of tooth wheels 78 and 79 carried on a shaft 80 which is mounted in bearings in supports 81 and is provided at its end with a pawl 82 of a Geneva stop device of which the wheel 83 is fixed to a drive shaft 84 for the filler conveyor 36, suitable jockey rollers being provided to compensate for the difference in diameter between the carrying roller 85 at the delivery end of the conveyor and the driving drum 86 mounted on the shaft 84.

The timing of the mechanism is conveniently arranged so that the filler conveyor is moved on the first step of the partition conveyor 35 after the eggs in the container EC have been discharged, and the mechanism is adapted by means of the change speed gears 76 and 77 to function for use with the twelve or six capacity fillers having respectively six or three cells in a row.

Accordingly, when the change speed wheel 76 is gearing with the wheel 78, after six steps of the partition conveyor 75, the Geneva pawl 82 through the gearing just described will be positioned ready to engage one of the teeth of the wheel 83, whereupon on the seventh step of the partition conveyor the wheel 83 is rotated one tooth to cause the filler conveyor to move one step to bring the next row of cells under the container EC.

On the other hand, if the change speed wheels are moved so that the wheel 76 is disengaged and the wheel 77 is engaged with the corresponding wheel 79 and the dumping cams 66 are moved into the second position, then on the third step of the partition conveyor the container EC will be opened and the eggs dropped into the waiting filler, and on the fourth step the filler conveyor will be moved to bring the next row of cells underneath the container ready to receive the next three eggs. In this case the apparatus will be feeding the smaller capacity filler having three cells in a row, and so that the fillers after being ejected from the filler magazine 87—hereafter described—and expanded, may be brought onto the left hand side of the filler conveyor in order to be positioned under the first three compartments of the container EC, there will be inserted in the path of the fillers, a deflecting plate DP which may be attached to the guide plate 101a and causes the fillers to be moved across the filler conveyor as the latter operates. On this left side of the filler conveyor there will be a guide plate 101b, which by engaging the leading edge of a filler turns the traversing fillers back into the straight path.

These guide and deflecting plates 101b and DP are necessary when the filler equipment is associated with the grading apparatus as herein shown, but if the direction of travel on the grading apparatus is reversed, then the deflecting plates will not be necessary, as the fillers will be required to be fed along the right hand side of the filler conveyor.

In some cases, however, by disposing the driving mechanism for the filler conveyor and the mechanism 100—103, (hereinafter described) for expanding the fillers ejected from the magazine, on the left hand side instead of the right as shown, the deflecting plates DP could be eliminated, and in such a construction the shaft 57 of the partition conveyor would be extended to carry the bevel wheel 72.

In order to feed a new filler from the magazine 87 for each two steps of the filler conveyor—the preferred form of filler employed having two rows of cells—the drive shaft 84 is provided with a toothed wheel 88 which gears with a second toothed wheel 89 fixed to a shaft 89a. On the shaft 89a is carried a cam 89b with which cooperates under the action of a spring 90a, the end of a connecting rod 90 sliding in guides 90b and in turn pivoted to a plunger 91 which moves vertically in guides 92.

The closed fillers in the magazine 87 are pressed up against a stop plate 93 (Fig. 4) by a pusher plate 94 provided with rods 95 mounted in guides 96 and connected to weights 97, the connecting cords of which run over pulleys 98 so that by means of the weights a constant pressure is exerted on the fillers in the magazine irrespective of the number of fillers therein.

In the position of the parts as shown, on the first step of the filler conveyor the cam 89b will permit the plunger 91 to descend immediately and feed one filler from the magazine on to a plate 99, the filler then being opened out by means of a movable finger 100 which engages one end of the filler and causes the filler end to abut against one of a pair of guide plates 101 and 101a and also against a rear plate 99a, and so turn about itself into the expanded position (indicated in Fig. 2) ready to be carried forward by the filler conveyor on the next step thereof, which for this purpose is conveniently provided with chocks 102 which engage in recesses formed between the two rows of cells of a filler.

During the opening out of the filler the end of the connecting rod runs on a concentric part of the cam 89b and the plunger will thus remain in the lower position. At the end of the step of the filler conveyor the connecting rod will stop just at the beginning of a rise of the cam so that on the next step of the filler conveyor the plunger is restored to the upper position shown, ready to eject the next filler.

In the case of the smaller capacity fillers as disclosed in the modification shown in Fig. 11, the magazine will have a partition plate 87a inserted and an auxiliary guide plate 101c will be attached to the stop plate 93 so as to act as the abutment when expanding the fillers by the fingers 100.

Movement of the fingers 100 is effected intermittently in synchronism with the movements of the filler conveyor, the timing being such that the plunger 91 descends before a finger reaches a position where it can engage the ejected filler, by means of an endless chain conveyor 103 the chains of which carry the fingers 100 suitably spaced apart and the sprockets of which are mounted on shafts 104 and 105 respectively, the shaft 104 being rotatably carried in the support 81 and the shaft 105 being rotatably mounted in bearings fixed to the supporting frame of the filler conveyor. At the lower end of the shaft 105 is fixed a toothed wheel 106 which gears with a wheel 107 mounted on a shaft 108 carrying a bevel 109 in turn gearing with a bevel 110 on the drive shaft 84, so that each time the latter is rotated the finger conveyor 103 is moved a sufficient distance to cause a finger 100 to open the filler which has been ejected from the magazine.

In order to understand clearly the sequence of operations which occur when an egg is graded in any particular section, the following summary is given:—

(1) The egg is weighed.

(2) The trap sinks down vertically and the cradle is diverted to the inclined guideway 27.

(3) The nose 8 of the plunger 6 engages the arm 31 of the cam 32 controlling a clutch for connecting the gear wheel 55 to the main drive.

(4) The gear wheel 55 is connected to the main drive.

(5) The partition conveyor 35 moves through a distance equal to the width of one compartment and stops, the gear wheel 55 being disconnected from the main drive.

(6) The plunger 6, during continued movement of the cradle discharges the egg into a compartment of the container EC.

(7) According to the positions of the dumping cams 66 and the change speed wheels 76 and 77, when five or two eggs have been received by the container EC and the partition conveyor is again operated by a sixth or third egg, the dumping cams 66—just as the conveyor stops—release the inclined plates V to let the eggs drop into the filler underneath the container EC and permit the sixth or third egg to fall direct to the filler, and on the next step the cams 66 close the plates V again ready to receive the seventh or fourth egg.

(8) Each time the partition conveyor 35 steps, the Geneva cam 82 is moved one-seventh or one-quarter of a revolution and accordingly when the said conveyor makes its seventh or fourth step the Geneva cam wheel 83 will operate the filler conveyor one step to bring the next row of cells under the container EC. At the same time the magazine plunger 91 may descend and feed one filler which is then opened by the fingers 100; on the next step of the filler conveyor the opened filler will be carried forward and the plunger 91 will ascend ready for the next feeding operation.

After an egg has been discharged into a container EC, the empty cradle continues along the lower track 28 and is prevented from tilting thereon by means of an auxiliary guide rail 111 which engages the right-hand runner of the cradle. When the empty cradle has passed the last grading section it is restored automatically into the initial path by inclining the lower track upwardly at 112 to join the upper track 14 just before the latter is turned so that the cradle may follow the endless conveyor 2. The turning of the upper track is effected by two pairs of semi-circular guides 113 and 114 one pair at each end of the track, the outer guide 113 being of U-shaped cross-section and the runners of the cradles running in the bight of the U so that the cradles are prevented from swinging off the guides as they move round them. The lower ends of the guides 113 and 114 terminate in a third track 115 which is supported on feet 116 of the main frame, so that the empty cradles after being turned are carried along this third track to the right-hand end of the machine where the guides at this end turn the cradles back on to the top track 14 ready to receive further eggs for grading.

A convenient method of supporting the ends of the belt of the conveyor 2 is by means of curved plates 117 which are secured to the main frame by rods 118 radially projecting from a fixed cross support 119, while support of the belt at intervals along its length may be obtained from parts 120 of the main frame, it being understood that after the first grading section A the parts 120 which are integral with the supports 15 constituting the main frame, will be connected thereto by bottom struts 121 so that a clear passage is provided for cradles running on the second track 28.

As the fillers are loaded with their full complement of eggs the filler conveyor carries them step by step towards and then deposits them on to a platform 121 for wrapping either by hand or automatically by a wrapping machine to which the fillers may be fed also automatically by providing a platform in the form of an endless conveyor.

Should a cradle carrying an egg pass through all the grading sections without being diverted, thereby indicating that the egg is not of standard weight, it will finally run on to an incline 122 in the upper track 14 and the rejected egg will slide off the cradle into a chute 123 which leads to a suitable container 124.

Alternatively, instead of the incline 122 an arm may be located in the path of the nose 8 of the plunger 6 of the approaching cradle so as to effect a positive ejection of the rejected egg.

When initially starting up the machine the fillers may be placed along the filler conveyors by hand but preferably the shafts 65 are connected up through suitable clutches and gearing to the motor M which will be disconnected by releasing the clutches upon the row of cells of the first filler coming underneath the containers EC. Subsequently the filler conveyors will operate as the eggs are graded in the manner before described.

As has been mentioned before, the eggs are candled before being placed on the cradles for grading, and accordingly the first grading section A will be disposed at a sufficient distance from the front end of the conveyor carrying the cradles to permit these operations to be carried out.

In a modification of the machine above described the cradle conveyor 2 and/or the filler conveyor 36 may be positively driven as by means of a chain and sprockets, the belts being attached to the chains, or by means of inward projections from the belts which engage in slots arranged around the periphery of the driving drums. For this purpose in the case of the filler conveyor the chocks 102 could be extended inwardly.

When a machine according to this invention is in operation the eggs after being candled are placed on the cradles by the operator and are thereafter automatically graded and packed into fillers which are subsequently wrapped ready for dispatch. The speed of operation is therefore increased and the necessity for handling the eggs is reduced to a minimum.

Whilst I have hereinbefore described one embodiment of a machine according to the present invention I wish it to be understood that the particular details and arrangement of parts may be varied or modified without departing from the scope thereof. Thus for example the machine may be adapted to accommodate any desired number of eggs and these may be divided into any desired grades or number of grades. Further the machine may include more than one egg-grading track so as to increase the capacity of the machine, the cradles or egg supports may be carried in many ways other than that specifically described and instead of feeding the eggs into containers from which they are subsequently discharged into fillers, such eggs may be discharged directly into removable fillers or containers representing the final containers for the eggs.

I claim:—

1. An egg grading and packing machine comprising means for feeding a plurality of eggs along a track, means located along said track and operable by eggs of selected weights for diverting said eggs in accordance with the grades into which it is desired to divide them, a compartmented container for receiving said diverted eggs, means for discharging said eggs into said container, means actuated automatically by the diverting of an egg for feeding an empty compartment of said compartmented container into proper position for receiving the diverted egg and means for releasing said graded eggs from the container when a desired number of eggs has been collected.

2. An egg grading and packing machine comprising means for feeding a plurality of eggs along a track, means located at spaced intervals along said track and operable when eggs of selected weights are positioned thereover for causing said selected eggs to be diverted from said track, a compartmented container for receiving eggs fed from each of the points at which they are diverted from said track and means for discharging said diverted eggs into the appropriate container, each of said containers comprising two inclined plates forming a trough, a plurality of partitions located between said plates to form egg-receiving compartments and means for feeding said partitions along said trough so that an empty compartment may be positioned for receiving each egg as it is diverted from the track of the ungraded eggs.

3. An egg grading and packing machine comprising means for feeding a plurality of eggs along a track, means located at spaced intervals along said track and operable when eggs of selected weights are positioned thereover for causing said selected eggs to be diverted from said track, a compartmented container for receiving eggs fed from each of the points at which they are diverted from said track and means for discharging said diverted eggs into the appropriate container, each of said containers comprising two inclined plates forming a trough, a plurality of partitions located between said plates to form egg-receiving compartments, means for feeding said partitions along said trough so that an empty compartment may be positioned for receiving each egg as it is diverted from the track of the ungraded eggs and means for separating said trough-forming plates at desired intervals in order to cause discharge of eggs from said container when a desired number has been collected.

4. An egg grading and packing machine comprising means for feeding a plurality of eggs along a track, means located at spaced intervals along said track and operable when eggs of selected weights are positioned thereover for causing said selected eggs to be diverted from said track, a compartmented container for receiving eggs fed from each of the points at which they are diverted from said track and means for discharging said diverted eggs into the appropriate container, each of said containers comprising two inclined plates forming a trough, a plurality of partitions located between said plates to form egg-receiving compartments, means for feeding said partitions along said trough so that an empty compartment may be positioned for receiving each egg as it is diverted from the track of the ungraded eggs, means for separating said trough-forming plates at desired intervals in order to cause discharge of eggs from said container when a desired number has been collected, and means for feeding fillers under said compartmented containers for receiving the eggs as they are discharged from said containers.

5. An egg grading and packing machine comprising means for continuously conveying a plurality of eggs along a track, means located along said track and operable by eggs of selected weights for diverting eggs of the appropriate weight from said track, a compartmented container for receiving said diverted eggs, means operated automatically by the diverting of an egg for positioning an empty compartment of said container for receiving said diverted egg and means for releasing said eggs from said container when a desired number has been collected, the means for feeding ungraded eggs and the means causing intermittent operation of the compartmented-container feeding and releasing means being driven from a common power source.

6. An egg grading and packing machine comprising an endless conveyor band, a plurality of cradles each adapted to support one egg and pivotally connected to said conveyor band, a track along which said cradles are conveyed, weight-operated traps located in said track and capable of being depressed when a cradle supporting an egg of appropriate weight is located thereon, inclined guides along which said cradles are conveyed when they rest on a depressed trap, means engaged by said cradles as they pass along the inclined guides for causing discharge of the eggs from the containers, compartmented containers for receiving the discharged eggs and a second track along which the empty cradles are fed and caused to return to the main track of the cradles carrying ungraded eggs.

7. An egg grading and packing machine comprising an endless conveyor band, a plurality of cradles each adapted to support one egg and pivotally connected to said conveyor band, a track along which said cradles are conveyed, weight-operated traps located in said track and capable of being depressed when a cradle supporting an egg of appropriate weight is located thereon, inclined guides along which said cradles are conveyed when they rest on a depressed trap, means engaged by said cradles as they pass along the inclined guides for causing discharge of the eggs from the containers, compartmented containers for receiving the discharged eggs, a second track along which the empty cradles are fed and caused to return to the main track of the cradles carrying ungraded eggs, and means for feeding an empty compartment of said compartmented container into proper position for receiving each egg, said means also being actuated by movements of the cradles down said inclined guides.

8. An egg grading and packing machine comprising a conveyor band, a plurality of egg-supporting cradles pivotally connected to said band by means of links, a track along which said cradles are fed, a series of traps located along said track each of said traps being adapted to become depressed when a cradle bearing an egg of appropriate weight is located thereon, an inclined guide along which each cradle is fed when it sinks to a level below that of the aforesaid track due to depression of a trap, a plunger located at one end of each cradle, means located in the path which said plunger follows as the cradle passes down the inclined guideway concerned, a compartmented container for receiving the graded eggs, means for feeding an empty compartment into proper position for receiving each egg as it is diverted from the track of the ungraded eggs, said compartment feeding means being actuated by the initial engagement of the aforesaid plunger with the means located in its path down the inclined guideway and later engagement of said parts causing sliding movements of the plunger whereby the egg concerned is ejected from the cradle and falls into the properly positioned compartment of the compartmented container.

9. An egg grading and packing machine comprising means for feeding a plurality of egg-supporting cradles along a track, a series of depressible traps located in said track said traps being loaded so that they are depressed when supporting a cradle bearing an egg of appropriate weight, inclined guideways located under said traps for diverting said cradles from the main track the leading edges of said cradles and the edges of the trap openings being inclined in order to ensure that a cradle will be diverted down the inclined guideway even though the trap be only slightly depressed, a compartmented container for receiving the eggs from the diverted cradles and means located in the paths of said cradles down the inclined guides whereby passage of a cradle down said guide will automatically position an empty compartment of said compartmented container for receiving the egg concerned and will also automatically cause ejection of said egg from the cradle into the desired compartment of the container.

10. An egg grading and packing machine comprising an endless conveyor, a plurality of egg-receiving cradles pivotally connected by means of links with said conveyor, a track along which said cradles are fed by movements of said conveyor, a series of depressible traps located in said track said traps being normally maintained in the plane of the track but permitted to become depressed when supporting an egg of appropriate weight and the loading of such traps being progressively decreased in the direction of travel of the cradles in a number of stages corresponding with the desired number of grades into which the eggs are to be divided whereby each trap passes only one grade of eggs, an inclined guideway located under each trap, each cradle after having caused a trap to be depressed being fed along an associated guideway, a plunger fitted to each cradle for ejecting an egg therefrom, a compartmented container associated with each point at which eggs are ejected, means for feeding an empty compartment of said container in proper position for receiving an egg to be ejected, said means for feeding the compartmented container and for causing ejection of the eggs from their supporting cradles being operated automatically by trip mechanism actuated by each cradle as it passes down an inclined guideway, means for feeding fillers under each of said compartmented containers, and means for releasing said eggs from each container and allowing them to pass into the associated filler, said filler feeding and egg-releasing means being operated automatically when a desired number of eggs has been collected in the container concerned.

11. An egg grading and packing machine comprising means for feeding a plurality of egg-supporting cradles along a track, depressible traps located in said track, said traps being loaded so that they become depressed when supporting a cradle bearing an egg of the appropriate weight and corresponding in number with the number of grades into which it is desired to divide the eggs, an inclined guideway located under each trap, each cradle when resting on a depressed trap being caused to travel along said guideway, a compartmented container for each grade of eggs, means operated automatically during the diversion of the said cradle for feeding an empty compartment of the associated container into proper position for receiving the egg, and means for automatically causing discharge of eggs from said container when a desired number has been collected, the loading of the traps being such that the cradles bearing the ungraded eggs first encounter the trap operable by the eggs of a weight corresponding to that of the minimum weight of the heaviest grade and thereafter in succession encounter traps operable by the eggs of a weight corresponding to that of the minimum value of the successively lower grades.

12. An egg grading and packing machine comprising means for feeding a plurality of egg-supporting cradles along a track, depressible traps located in said track, said traps being loaded so that they become depressed when supporting a cradle bearing an egg of the appropriate weight and corresponding in number with the number of grades into which it is desired to divide the eggs, an inclined guideway located under each trap each cradle when resting on a depressed trap being caused to travel along said inclined guideway, a compartmented container for each grade of eggs, means for ejecting the eggs from said diverted cradles into the one of said compartmented containers appropriate to the grade of eggs concerned, means operated automatically by the passage of a cradle along an inclined guideway to feed an empty compartment of the container corresponding to the grade of the diverted egg to a position for receiving said egg, means operated automatically when a desired number of eggs has been collected in said container to cause the discharge of the eggs from said container, the loading of the traps being such that the cradles bearing the ungraded eggs first encounter the trap operable by the eggs of a weight corresponding to that of the minimum value of the successively lower grades, means being provided for causing ejection of the eggs from any cradles which pass over all of the traps in the track of the cradles.

13. An egg grading and packing machine comprising means for feeding a plurality of egg-supporting cradles along a track, depressible traps located in said track, said traps being loaded so that they become depressed when supporting a cradle bearing an egg of the appropriate weight and corresponding in number with the number of grades into which it is desired to divide the eggs, an inclined guideway located under each trap each cradle when resting on a depressed trap being caused to travel along said inclined guideway, a compartmented container for each grade of eggs, means for feeding an empty compartment of the associated compartmented container to a position for receiving the egg from said cradle, means for ejecting the egg from said cradle into said empty compartment, means for feeding fillers under each of said compartmented containers and means for causing discharge of the eggs from each container into the associated filler, the means for feeding the compartmented container and for causing the ejection of eggs from their supporting cradles being operated automatically by the passage of each cradle along said inclined guideway and said filler feeding and egg discharging means being operated automatically when a predetermined number of eggs has been collected in the container concerned.

14. An egg grading and packing machine comprising means for feeding a plurality of egg-supporting cradles along a track, depressible traps located in said track, said traps being loaded so that they become depressed when supporting a cradle bearing an egg of the appropriate weight and corresponding in number with the number of grades into which it is desired to divide the eggs, an inclined guideway located under each trap each cradle when resting on a depressed trap being caused to travel along said guideway, a compartmented container for each grade of eggs, and means operated by the passage of a cradle along a guideway to feed an empty compartment of the associated container into proper position for receiving an egg.

CHARLES NATHANIEL BARTON.